United States Patent [19]
Cunningham

[11] Patent Number: 5,447,376
[45] Date of Patent: Sep. 5, 1995

[54] PACKAGE BEARING SYSTEM

[76] Inventors: Eldon R. Cunningham, deceased, late of Fort Wayne; Shirley J. Cunningham, personal representative, 917 Ansley Dr., both of Fort Wayne, Ind. 46804

[21] Appl. No.: 165,486
[22] Filed: Dec. 13, 1993
[51] Int. Cl.⁶ ............................................. F16C 23/04
[52] U.S. Cl. ................................. 384/192; 384/203; 384/206; 384/214
[58] Field of Search .............. 384/192, 213, 214, 216, 384/203, 204, 206, 408–413, 211

[56] References Cited

U.S. PATENT DOCUMENTS

| | | | |
|---|---|---|---|
| 2,365,552 | 12/1944 | Hill | 384/213 |
| 2,541,160 | 2/1951 | Heim | 384/206 X |
| 2,654,643 | 10/1953 | Reese | 384/211 |
| 3,034,838 | 5/1962 | Abel | 384/214 |
| 3,332,727 | 7/1967 | Gandrud | 384/214 |
| 3,801,395 | 4/1974 | Stuck | 384/203 X |
| 4,034,996 | 7/1977 | Manita et al. | 384/203 X |
| 4,711,590 | 12/1987 | Lakin | 384/206 |

FOREIGN PATENT DOCUMENTS 562391 6/1944 United Kingdom ............... 384/213

*Primary Examiner*—Thomas R. Hannon
*Attorney, Agent, or Firm*—Roger M. Rickert

[57] ABSTRACT

A self contained, "package", bearing system, has relatively rotating and sliding, precisely formed, truncated spherical, journal and bearing surfaces with a high hardness and with a low surface roughness, that operate on a thin hydrodynamic film of pressurized lubricant, when the bearing system is operated under any combination of axial and radial loads. It optionally contains either a supply of dry lubricant, or normally a capillary supported, self-contained reserve of fluid lubricant, and a system of "internally discharging" throwers, for keeping the fluid lubricant within the system, to promote a long operating life.

Lubricant re-circulation channels at the ends of the bearing and the inherently lower rates of flow of lubricant from the ends of truncated spherical bearings facilitates achieving long operating life. Grooves and recesses are optionally included in the bearing surfaces for enhancing the axial load capacity. Axial wear of the softer bearing surface maximizes the axial load capacity without grooves.

One embodiment consists of only two bearing parts surrounding one journal part, and a reserve of lubricant.

Preferred embodiments use hardened and sealed powdered metal bearing surfaces, and harder journal surfaces, that permit the development of hydrodynamic load capacities that are high enough to permit the system to replace package bearing system that utilize ball type rolling elements.

14 Claims, 10 Drawing Sheets $$\text{TOTAL LOAD} = \int_0^L P dL = lbs.$$

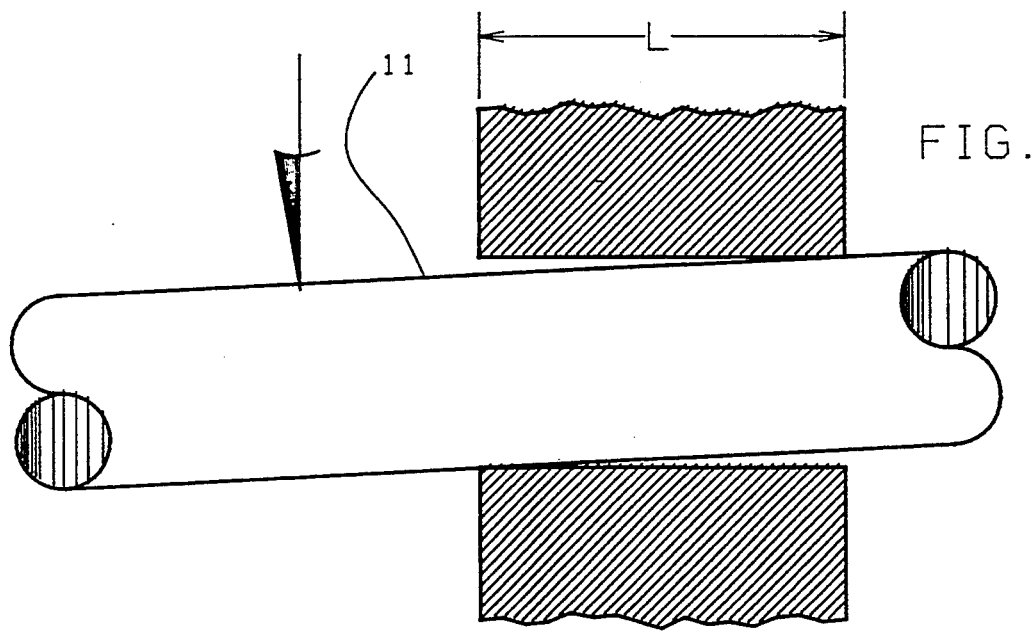
FIG. 4a
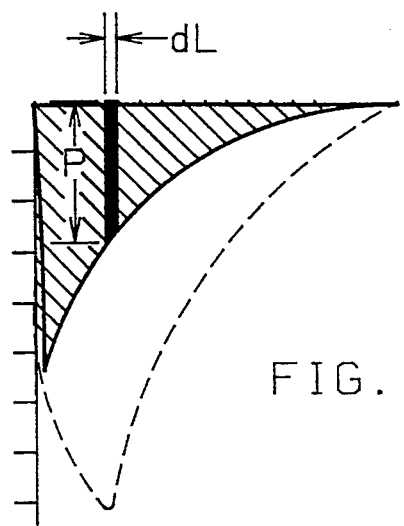
FIG. 4b
$$\text{TOTAL LOAD} = \int_0^L P dL = lbs.$$
FIG. 4

TOTAL LOAD = $\int_0^L P dL = lbs.$

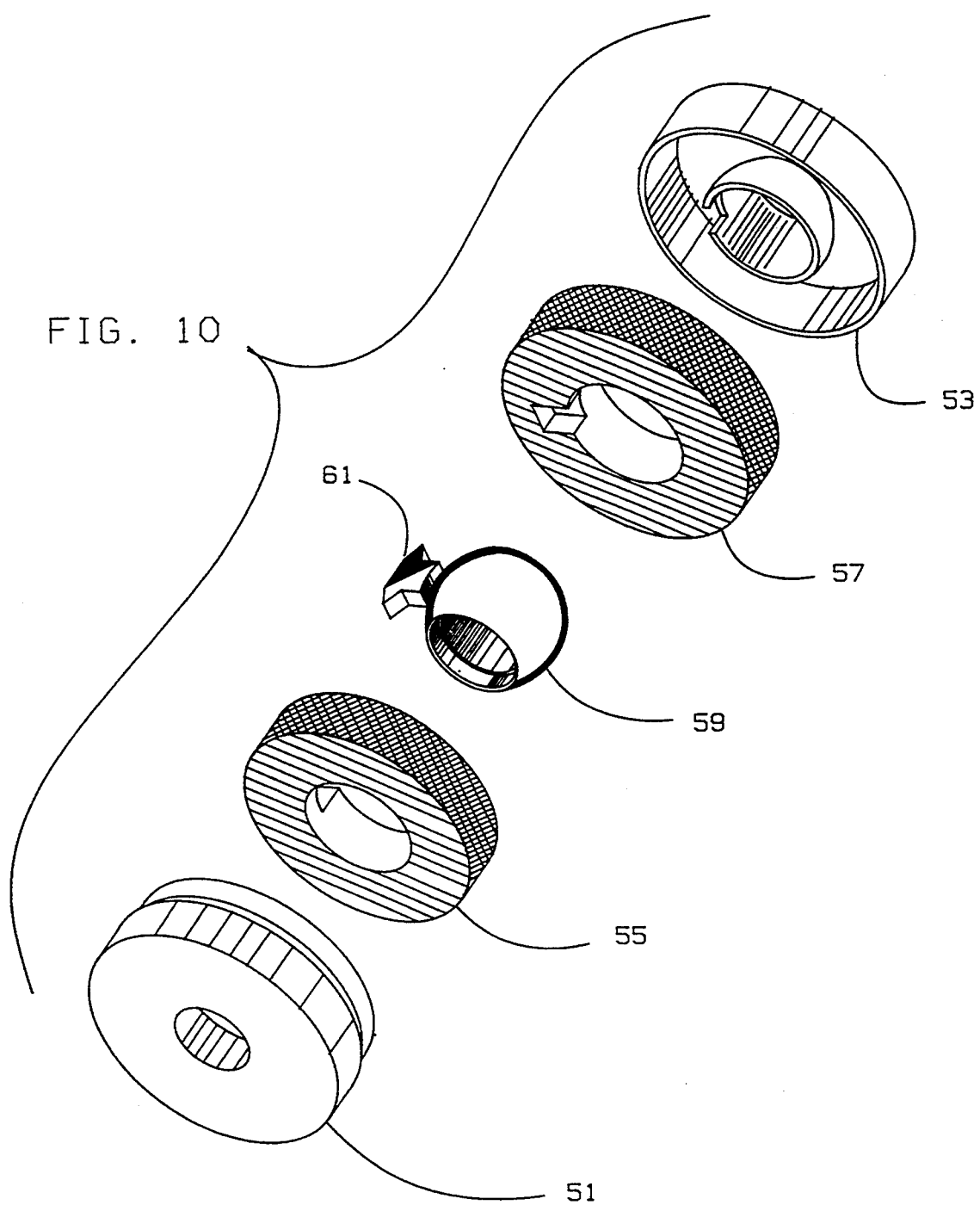

PACKAGE BEARING SYSTEM

FIELD OF THE INVENTION

This invention relates to a category of bearing systems for supporting shafts and rotors of machines, that utilize two surfaces that slide on each other, one of which rotates relative to the other, and is circular in all the planes that are perpendicular to the axis of rotation of the rotating surface. This system is unique in this category, in that it uses the same two rubbing surfaces to carry both axial and radial loads, instead of requiring two surfaces to carry radial loads and another two surfaces to carry axial loads. Systems in this category are in contrast to bearing systems in the category that have multiple rolling elements separating the relatively rotating surfaces.

More particularly, this invention relates to self-contained, "package", non-integral, bearing systems, (in contrast to those that are made integral with the supported machine components), with the two sliding surfaces made of truncated, substantially spherical sliding surfaces, one of which is round in a radial plane, with an integral supply of lubricant and a means for keeping the lubricant within the system, when long lubrication system life, which permits a long operating life, is of primary importance.

BACKGROUND OF THE INVENTION

Because of their simplicity of construction, the earliest known sliding surface bearing systems that were used in the first machines, were probably those used on wheeled carts, such as those found in the Egyptian pyramids. They consisted of a stationery shaft with substantially cylindrical surfaces located at each end, called "journal surfaces", that were supported by substantially axial cylindrical holes, called "bearing surfaces", that were formed in the center of two round discs or wheels.

Animal tallow was placed in the small clearance space that existed between these "journal" and "bearing" surfaces, to minimize their wear. These surfaces wore rapidly because they were made of wood, wood and stone, or soft metals, all of which have low wear resistance. Chariots also used such bearing systems.

With the advent of the steam engine and the development of railroad engines capable of pulling wheeled carts at high speeds, in the 1880's, there developed a great need to reduce the rate of wear of the "sliding cylindrical surface" bearing systems that were used by the engines and the load carrying carts. The resulting experimental discoveries of the engineer Beauchamp Tower, and his consultations with the mathematician Sir Osborne Reynolds, lead Reynolds to develop a theory of hydrodynamic lubrication that explained the development of significant static pressures, in the fluid film of lubricant that is within these fluid lubricated, cylindrical surface, sliding surface bearing systems, of sufficient magnitude to cause the bearing systems to run without significant contact between the journal and bearing surfaces. The resultant effect, was a greatly decreased, if not a total lack, of "material to material" contact pressures between the journal and bearing surfaces that eliminated substantial wear during the operation of such bearing systems, when certain design (unit loading and good surface geometry) and operating conditions (adequate lubricant quantity and viscosity and rotational speed), were met. Most of the remaining wear then occurred at very low rotational speeds incident to starting and stopping, and inability to keep lubricant in the clearance.

Refinements of this theory point to the need for, (a), increased precision with which the surfaces of the "journals" and the "bearings" approach perfect cylinders, and, (b), reduced "roughness" of these surfaces, so that these bearing systems could be operated with, (c), a sufficiently small diametral clearance between the journal and bearing surface, so that these bearing systems can operate at the smallest practical "minimum surface separation", which condition maximizes the load capacity by making the thickness of the lubricant film a minimum, and, (d), always having the axis of the bearing surface parallel with the axis of the journal surface.

This last requirement must be met with various radial loads on the shaft, and the resultant variety of bending of the shaft on which the journal surface is mounted, and over the range of the tolerances that determine the possible misalignment between the axes of the bearing and journal surfaces. This requirement can only be met in actual machines by mounting the bearing and journal surfaces so that they can move to a perfectly aligned condition. This introduces a complexity of design that can usually only be afforded in large machines, such as steam turbines and generators.

Thus, precise surface geometry and perfect alignment of the axes, permits the achievement of very high hydrodynamic film pressures and a correspondingly high load capacity, which makes possible a negligible rate of wear during operation at constant relative rotational speed. This is true for the absolute rotation of either the journal or the bearing surface, as long as one surface slides relative to the other.

The relation of hydrodynamic load capacity and the value of "minimum surface separation" and of "minimum film thickness", while all other factors that affect load capacity, such as the linear rubbing speed, diameter and axial length of the journal and bearing surfaces, clearance, alignment, viscosity of the lubricant, rate of lubricant supply to the clearance space, are kept constant, is shown in FIG. 1. This curve shape reveals that a reduction in "minimum film thickness" produces an exponential increase in load capacity. This rate of increase becomes proportionately greater, for a given incremental change in minimum film thickness, as the absolute value of minimum film thickness approaches zero as a limit.

Pressures as high as 20,000 lbs per square inch have been measured in practical bearings. Merely polishing a steel journal of a commercially produced electric motor bearing system, to be smoother and closer to purely cylindrical, caused a quadruple increase in load capacity, from 60 pounds to 240 pounds.

Because of the geometrical inaccuracies of practical journal and bearing surfaces, there is a difference between the minimum mechanical clearance 1 (FIG. 2) that can exist between the tops of the peaks of the roughness of the surfaces of the journal and bearing, and the average or effective thickness 2 of the film of lubricant that lies between valleys and peaks of the surfaces, and in which hydrodynamic pressures are generated. It is the slightly converging or wedge shape of the lubricant film that is in the valleys, that exist between the peaks of the surface roughness, as depicted in FIG. 2, that is required for the generation of hydrodynamic pressures within this film. It is the "dragging" or "pumping" of lubricant into this converging or wedge shaped clearance, that is caused by the relative tangential movement of the sliding surfaces, and adhesion of the lubricant to the journal and bearing surfaces, that causes pressure to be produced in the fluid film. The average velocity of the movement of lubricant into this converging wedge space is one half of the relative or tangential rubbing velocity between the surfaces.

The diametral clearance between the journal and bearing must become as small as 0.0015 times the journal diameter to make the convergence sufficiently small to permit development of significant static fluid pressures. The angle of convergence then is the order of less than 0.055 degrees. Achieving this low angle of convergence, when the journal surface is touching one side of the bearing surface, requires that a bearing surface for a 0.500" diameter journal surface have a diameter of 0.5*(1.0015)=0.50075", and thus a 0.0075" diametral clearance.

As the minimum mechanical clearance 1, see FIG. 2, through which the lubricant must pass (assuming the axial length of the bearing is infinitely long), as it circulates only circumferentially in the clearance space, becomes smaller, the resistance to this flow increases, and because the moving journal is now very effective in forcing lubricant into this converging space, when the convergence angle of the clearance space is very small, the static pressure in the lubricant is forced to become higher until it is able to make the lubricant flow through the narrow minimum mechanical clearance 1 as fast as it is brought into the convergent space. This balanced condition establishes the prevailing minimum film thickness, 2 of FIGS. 1 & 2.

When the minimum mechanical clearance 1 of FIG. 2, becomes as small as the roughness of the surfaces will allow without the tops of their roughness peaks actually touching, and when the surface roughness is very small, (about 0.000,016 inches from peak to valley), then the pressures developed in the converging film of lubricant become near their theoretical maximum value. This is the explanation for the different values and shapes of the curves 14 and 16 of FIG. 1.

In all of this discussion so far, the assumption has been made that the axis of the cylindrical journal surface, and the axis of the cylindrical bearing surface, are perfectly parallel, in all planes, and at all times, as depicted in FIG. 3. The probability that this condition prevails for just one of the bearings of a practical machine, such as for a bearing system of an electric motor or a grinding spindle, is very low, because of the range of the many tolerances that determine the principal angles between these axes and because of the bending of the shaft due to radial loads.

Now this parallelism is an unrealistically assumed condition for the "as assembled" machine, before any radial loads are applied to the shaft or rotor of the machine. Once a radial load is applied to a rotor shaft extension, it causes the journal that is nearest to the radial load, to move radially from its unloaded position toward its bearing surface at the outer end of the bearing, and the journal to become misaligned within the bearing, as in FIG. 4. All of this explanation shows that if a typical cylindrical journal surface is 0.5000" in diameter, and rotates within a cylindrical bearing surface that is 0.5008" in diameter and 0.650" in axial length, and an overhanging radial load (caused by belt tension and pulley weight) holds the journal against one side of its bearing surface, then the journal would only touch the bearing surface at a circle of contact at its outer end, instead of over its full axial length, as perfect parallelism assumes.

These bearing and journal size dimensions are typical of those of a bearing system that is produced in quantities of many millions per year for electric motors that drive outdoor condenser cooling fans for home air conditioning systems. The bending of the shaft that is caused by the above radial load thus also adds to the lack of parallelism between the bearing and journal axes.

Now the peak hydrodynamic pressures that are developed within the fluid film in such a bearing system when it satisfies the perfectly parallel requirement, only exist at the axial center of the bearing, and decrease to zero at the outer ends of the bearing, as depicted in FIG. 3, which shows a symmetrical parabolic distribution of the hydrodynamic pressures in an axial plane through the bearing axes. The total load supporting capacity of the bearing system is a maximum when this symmetrical axial pressure distribution prevails.

When the journal and bearing axes are misaligned by the maximum amount that can prevail in a given bearing system, the axial distribution of pressure becomes asymmetrical as depicted in FIG. 4. The peak pressure is now lower and the total supporting capacity of the bearing system is now much lower, as much as 60% lower than for the parallel condition.

The angle through which the circumferential distribution of pressure exists can vary greatly, depending on how fast lubricant is supplied to the converging clearance space. The maximum possible span is 180 degrees, but practically it is much less, particularly if the lubricant is supplied at a rate that is less than the converging film can utilize, (which is called "the classical feed rate").

The capillary wicking systems that are used to feed fluid lubricant to the journals of the example bearing system above, cause this angular span to be nearer 90 degrees for a new bearing, and much less as lubricant is lost from the system. The zero pressure boundaries of the pressurized film of lubricant define an elliptical shape when the area is projected onto the bearing surface.

Now the cylindrical surfaces (and their axes), of the journal and bearing are rarely, in practice, parallel which is a perfect condition. The tolerances of the dimensions of machine components, that can be economically held for mass produced machines and bearing systems, and the axial lengths of the bearing surfaces, determine the angular degree of lack of parallelism or misalignment that prevails between the journal and bearing surfaces of all practical cylindrical surface bearing systems.

In fact, the average resultant amount of misalignment cause the cylindrical journals to touch the ends of the cylindrical journals for a significant (15%) percentage of high production assemblies, such as for electric motors, and bind against them with such high forces that the frictional torque required to turn the journals in the bearings is excessive, and is large enough to cause low average bearing system life. This is true because the diametral clearances that are needed to produce the necessary low levels of quietness and high levels of hydrodynamic fluid pressure, must be so small, i.e., about 0.0015×the journal diameter.

The bearing surfaces have traditionally been made of a layer of the metal Tin, at least 0.020″ thick, that is bonded to a backing layer of steel, about 0.060″ thick. The bi-metal material is then rolled into a cylinder with the steel on the outer diameter. The outer diameter is then ground to a medium tolerance so that the cylinder can be press fitted into a machined hole in a housing. The layer of Tin at the bore is then machined to a precision diameter that is concentric to the mounting surface on the outer diameter of the housing.

One of the many virtues that is provided by the Tin bearing surface is that when the journal is highly misaligned after machine assembly, the harder steel journal surface can rapidly wear a way some of the Tin at the ends of the bearing which relieves this contact pressure, if the motor or machine has sufficient operating torque to cause rotation. In the case of inherently low torque motors, such as those used to drive direct mounted fans, the cylindrical bearing surface has traditionally been supported by a spherical outer surface that is held into a spherical socket by an axial spring, so that the bearing surface can be aligned to the shaft journal if sufficient tilting torque, to promote improved alignment, is available. Sufficient tilting torque is usually not available and the bearings actually operate in a misaligned condition.

These latter bearing systems have been called "self aligning", which is a misnomer, because all practical designs require more tilting torque to make them align than is available in the application. For instance, the bearing systems of many motors that drive automotive heating and cooling system blower wheels run misaligned throughout their entire useful life, which is often too short, because these misaligned bearings quickly loose their supply of lubricant and become noisy. This was the case with many automotive blower motors of a particular design and manufacture that had an unacceptably high field failure rate.

FIG. 5 shows that when the journal and bearing surfaces are made to be a portion of a sphere that the initial assembled relationship and also any change in the relative tilting angular relationship (such as the shaft and its affixed spherical journal moving from position 4 to position 6 as indicated by arrow 5) between the spherical journal and the adjacent spherical bearing surface cannot cause the equivalent of the misalignment that cylindrical surface bearing systems can have. The clearance between the journal and bearing versus axial location in the bearing is not altered by initial assembly tolerances or by bending of the shaft. This means that such a bearing system always has initially and always retains the inherent ability to develop its maximum hydrodynamic load capacity.

In spherical surface bearing systems, the clearance between the journal and bearing surfaces, where load causes the journal surface to be closest to the bearing surface, is not perfectly uniform initially. But calculations show that a very small amount, (about 70% of the nominal initial radial clearance), of wearing away of the bearing surface is sufficient to make this clearance uniform for any direction of loading, whether pure radial, pure axial, or a mix of these. This preferential wear of the bearing surface may be obtained by having the hardness of the journal surface greater than that of the initially hard bearing surface.

The non-uniform initial clearance does not prevent the bearing system from having appreciable load capacity, especially for radial loads, but the slight wear that makes the clearance uniform increases the load capacity, as is depicted in FIG. 5. Wear is needed more for axial loads because there is no convergence in the clearance initially, as is true for radial loads.

A test on an axially loaded spherical journal, as reported by M. C. Shaw and C. D. Strang, in the Journal Of Applied Mechanics of the American Society Of Mechanical Engineers for June 1948 and March 1949 show a surprisingly high axial load capacity is readily obtained even with a low viscosity lubricant and moderate revolutions per minute. Wear causes a relatively reduced clearance at the periphery of the bearing area that inhibits flow of lubricant out of the clearance, that enhances load capacity.

SUMMARY OF THE INVENTION

The present invention relates generally to spherical bearings. Spherical bearings are not new. Their advantage is that they will tolerate both axial and radial loads while sleeve bearings require an additional bearing surface to axial loading.

Among the objects of this invention are to provide an improved "package" sliding element bearing system that overcomes at least some of the significant disadvantages of bearing systems that use cylindrical journal and bearing surfaces, as described above, so that a bearing system capable of a high level of hydrodynamic loading per unit of volume, for all possible directions of loading, is provided by the use of fewer precision parts than previously possible while providing an inherently longer operating life, at minimum cost in comparison to presently available integral or package type bearing systems.

Generally, one form of the invention is a package bearing system assembly that can be assembled within machines in a manner similar to the assembly of currently available package rolling element bearing systems, but with certain advantages, such as a lower operating noise level and a greater resistance to impact loads and vibration, while requiring somewhat greater axial space for a given load capacity.

Among the several objects of the present invention may be noted the provision of a spherical bearing arrangement having two truncated hemispherical outer bearing portions; the provision of a spherical bearing arrangement having lubrication points spaced axially from one another; the provision of a spherical bearing arrangement with the inner journal fixed to the shaft with the spherical portions free to tilt as well as rotate relative to one another; the provision of a spherical bearing arrangement having a recirculating lubrication system; the provision of a fiber matrix for holding a fluid lubricant in capillary suspension; the provision of a self-contained lubricant supply for a spherical bearing in an electric motor environment; and the provision of a spherical bearing arrangement according to the previous object having improved lubricant retention. These as well as other objects and advantageous features of the present invention will be in part apparent and in part pointed out hereinafter.

In general, a sliding element bearing system includes a journal portion with an external surface which is substantially the shape of the external surface of a portion of a sphere and with a central bore that is concentric to the spherical outer surface and that can be assembled onto and fixed to rotate with a rotatable shaft and a bearing portion surrounding and rotatably supporting the journal portions. The bearing portion has an internal bearing surface which is substantially the shape of the internal surface of a portion of a sphere of radius slightly greater than the radius of the spherical surface of the journal portion to thereby provide a clearance space between the journal portion and the bearing portion. The bearing portion comprises a pair of frusto-hemispherical pieces joined at a common plane.

Also in general and in one form of the invention, a package sliding element bearing system includes a generally spherical journal portion that can be assembled onto and fixed to rotate with a rotatable shaft and a bearing portion surrounding and rotatably supporting the journal portion for relative rotation therebetween about an axis. The bearing portion has an internal bearing surface which is substantially the shape of the internal surface of a portion of a sphere of radius slightly greater than the radius of the spherical surface of the journal portion to thereby provide a clearance space between the journal portion and the bearing portion. Lubricant is supplied from a fluid lubricant reservoir to the clearance space between the journal portion and the bearing portion at a plurality of axially spaced locations and there is an arrangement for receiving lubricant from the clearance space and returning the received lubricant to the reservoir. Lubricant is supplied by a plurality of feed wicks made of fibers with capillary spaces therebetween. There are a pair of such feed wicks located one each in close proximity to the clearance space near the axial extremes of the journal portion to supply lubricant to the clearance space. There is an arrangement for maintaining the location of this pair of feed wicks relative to the axis as well as another feed wick which contact the journal portion about midway between the axial extremes thereof.

BRIEF DESCRIPTION OF THE DRAWING

FIGS. 4a and 4b similarly illustrate the axial profile of peak hydrodynamic pressure of misaligned cylindrical bearing and journal surfaces;

FIG. 10 is an exploded assembly view of a low cost alternate embodiment of the present invention.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
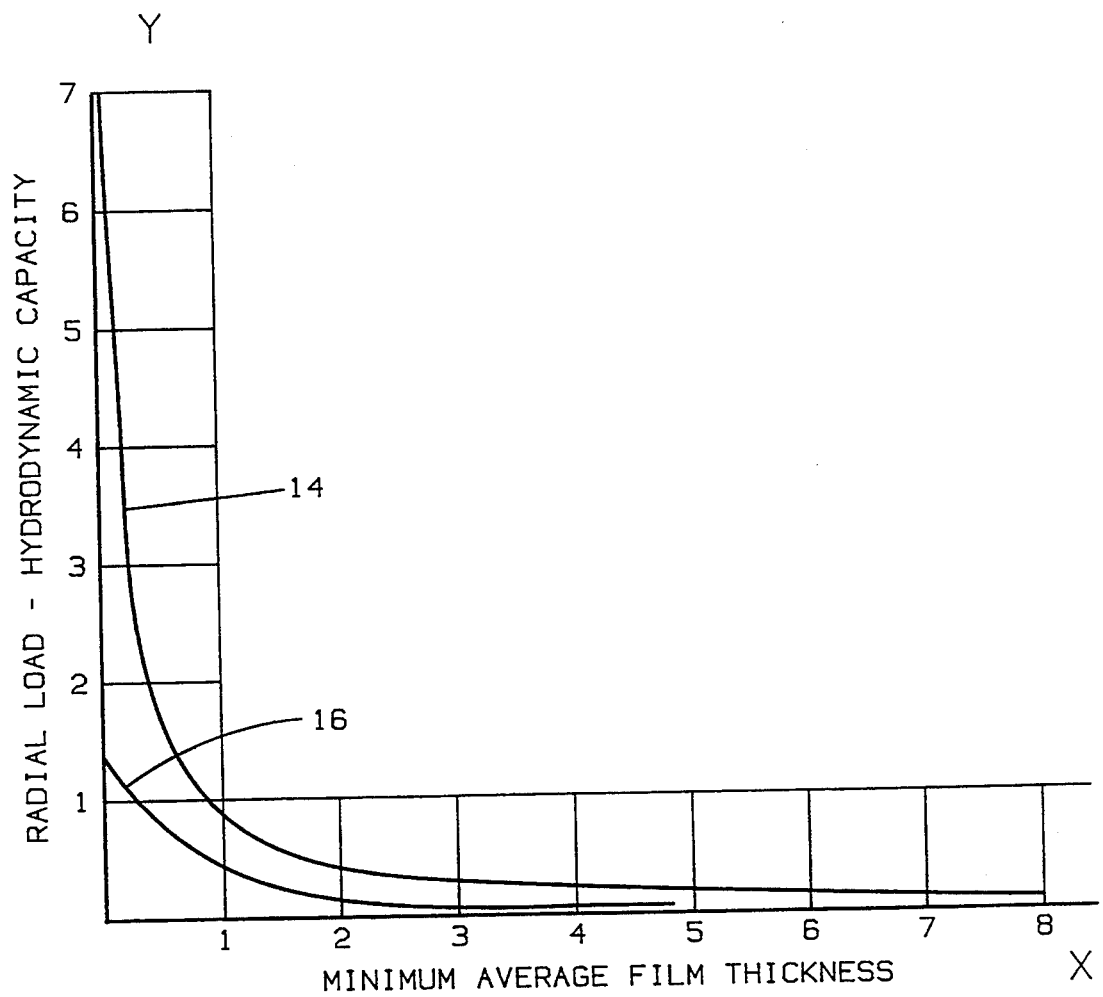
FIG. 1 is a graph of hydrodynamic load vs. minimum average film thickness and roughness of the sliding surfaces.

FIG. 1 shows the relation of hydrodynamic radial load capacity for a sliding surfaces type bearing system, in relation to the minimum fluid film thickness (Ho, 2 of FIG. 2) that prevails in the clearance space between the journal and bearing surfaces of any hydrodynamically operating sliding element bearing system. The exponential shape reveals how rapidly the load capacity increases as Ho decreases. This relation is depicted for a bearing system, curve 3, which has a perfectly round and straight journal and bearing surfaces and a roughness of the two surfaces of 4 microinches average, and for another system, curve 6, whose surfaces are not as round or geometrically true, and whose roughness is 16 microinches. The axes of the journals and bearing surfaces, if cylindrical, are assumed to be perfectly parallel for both systems and all other design parameters are the same. But performance is much different because the higher roughness of the rubbing surfaces of the system of curve 16 limit how small the minimum film thickness, Ho, can become before the peaks of the roughness of the surfaces make contact. The difference in diameter between the journal and bearing surfaces must be sufficiently small to make the angle of the wedge shaped clearance space small enough to promote an optimum degree of hydrodynamic action. A difference in diameter of the journal and bearing surfaces of about 0.001" per inch of journal diameter is adequate.

Figure 2:
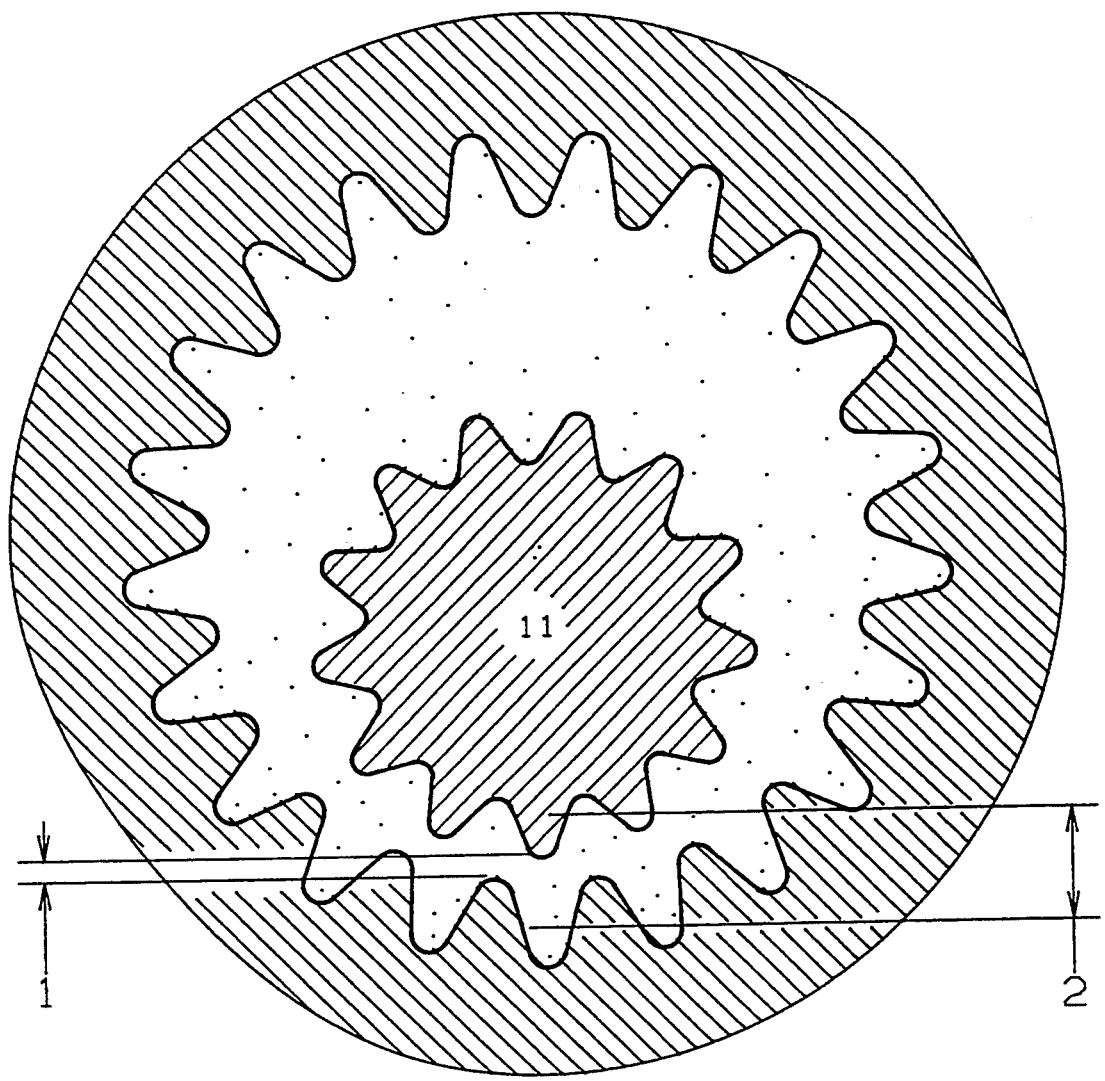
FIG. 2 is a view in cross-section showing surface peaks and valleys of practical bearing and journal surfaces.

FIG. 2 depicts, with exaggeration for clearness, the general nature of the roughness of actual journal (8 of FIG. 6) and bearing (9 of FIG. 6) surfaces and reveals they consist of "mountain" peaks or high spots separated by valleys that are filled with fluid lubricant. The gradual convergence of the surfaces to the point of closest mechanical spacing, at which the minimum average fluid film thickness Ho, 2 of FIG. 2, exists, is depicted. The more shallow the valleys become the smaller the minimum film thickness can become. This shows why a smaller roughness of journal and bearing surfaces permits a greater hydrodynamic load capacity, in accordance with FIG. 1.

A roughness of 4 microinches, arithmetic average, permits near optimum hydrodynamic operating conditions. Some roughness is desired to assure that lubricant is pulled into the converging wedge and assures positive local lubrication of contacts of the individual surface peaks.

Figure 3A:
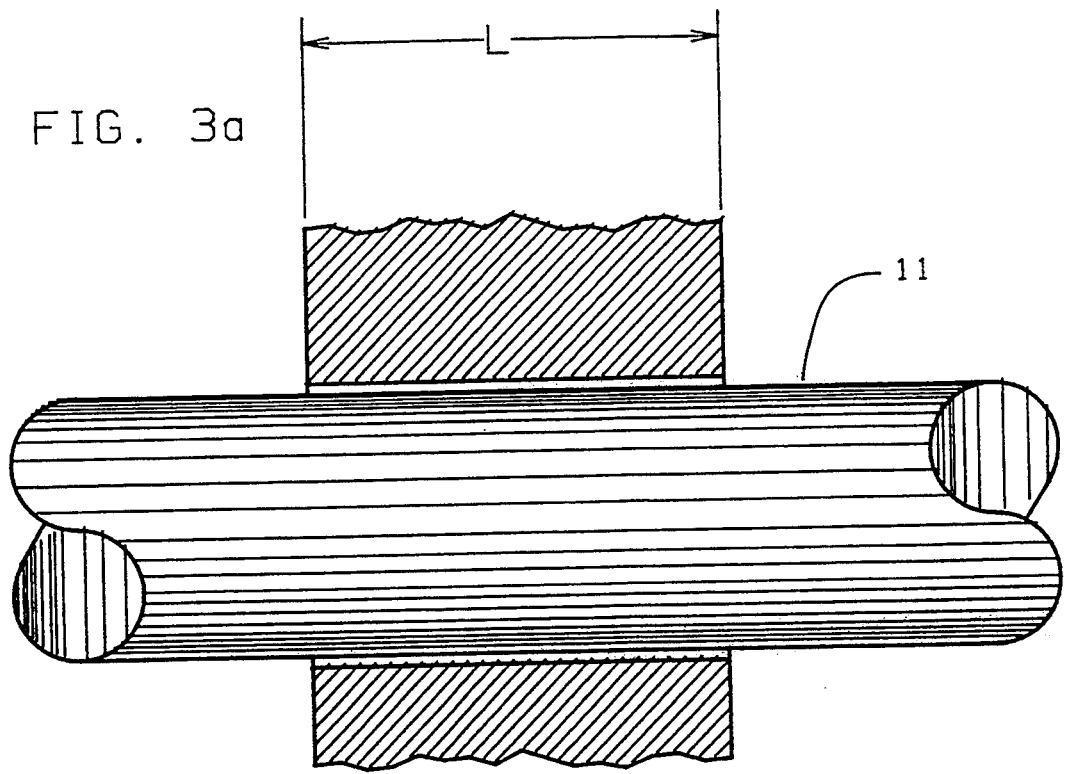
FIG. 3a and 3b illustrate the axial profile of peak hydrodynamic pressure of aligned cylindrical bearing and journal surfaces.
Figure 3B:
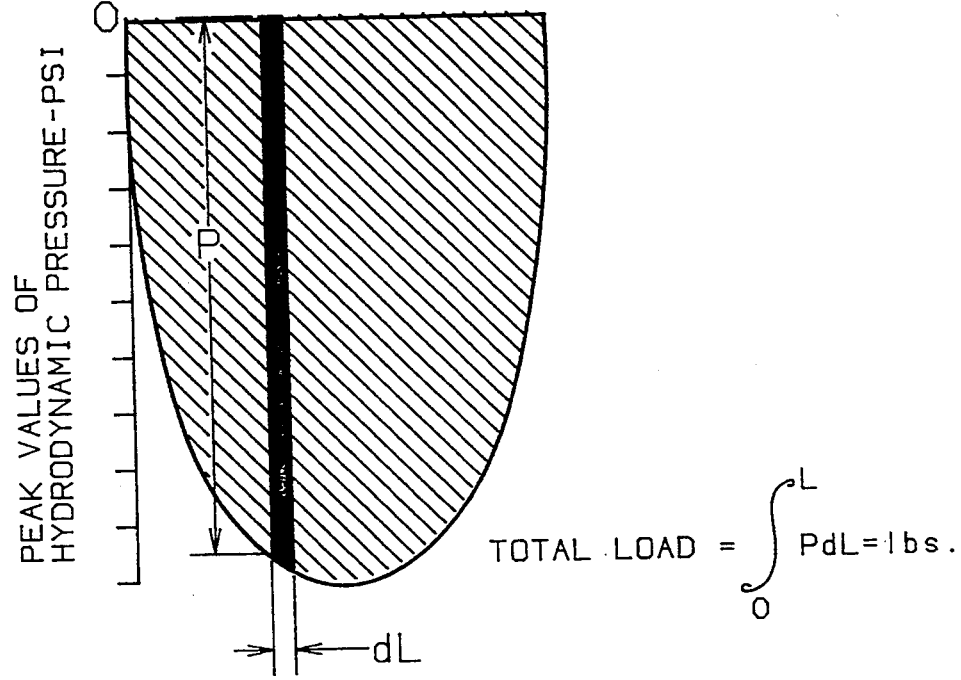

FIG. 3 shows the symmetrical axial distribution of the peak pressure in the hydrodynamic film of lubricant for a rubbing surface bearing with a cylindrical journal surface that is perfectly aligned with the cylindrical bearing surface within which it rotates. The profile of this pressure is parabolic in shape. This profile permits the development of maximum load capacity, since the peak pressure can be a maximum at the axial center.

FIG. 4 shows the asymmetrical axial distribution of the peak pressure in the hydrodynamic film of lubricant for a rubbing bearing with a cylindrical journal surface that is misaligned with the cylindrical bearing surface within which it rotates. The profile of this pressure is no longer parabolic in shape. This profile shows a greatly reduced development of pressure due to the fact that the minimum film thickness increases rapidly along the axial length of the bearing. The development of load capacity may be as low as 30% of that for the aligned condition, and decreases as the misalignment increases. The high rate of axial flow of lubricant out of the clearance space that misalignment causes, robs the converging clearance space of lubricant and reduces the hydrodynamic pressures and thus load capacity that can be developed.

Figure 5A:
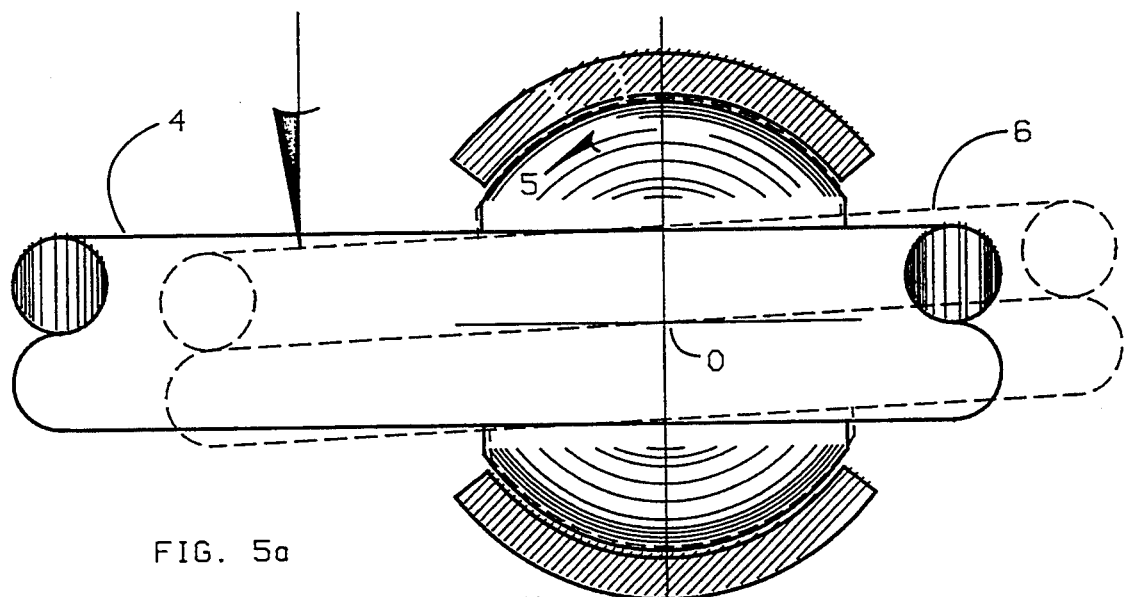
FIGS. 5a and 5b similarly illustrate the axial profile of peak hydrodynamic pressure for a bearing system with spherical journal and bearing surfaces.
Figure 5B:
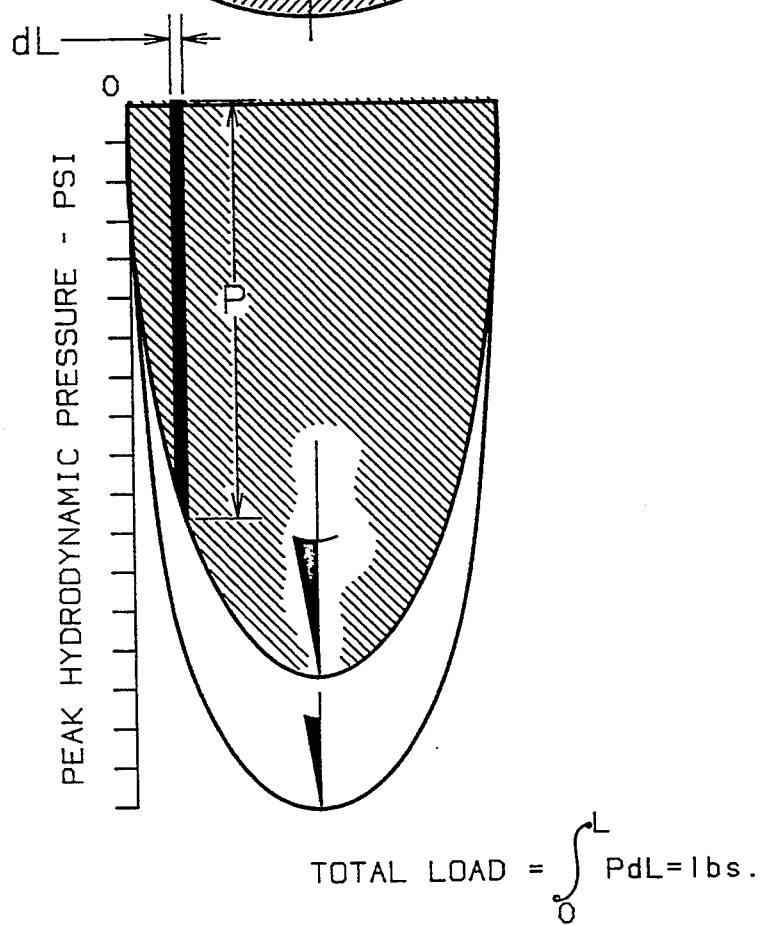

FIG. 5 shows that the axial profile of the peak hydrodynamic pressure in the bearing clearance remains symmetrical and parabolic, and the total hydrodynamic load capacity remains a maximum at all times for all alignment relationships within the bearing system and the particular assembly conditions caused by assembly tolerances of the machine into which a spherical journal and bearing surface bearing system is assembled. The profile, peak pressures, and load capacity are not changed by the bending of the shaft that is caused by application of radial loads to the shaft. Thus, there are no deteriorating effects equivalent to those caused by misalignment in cylindrical surface bearing systems.

Figure 6:
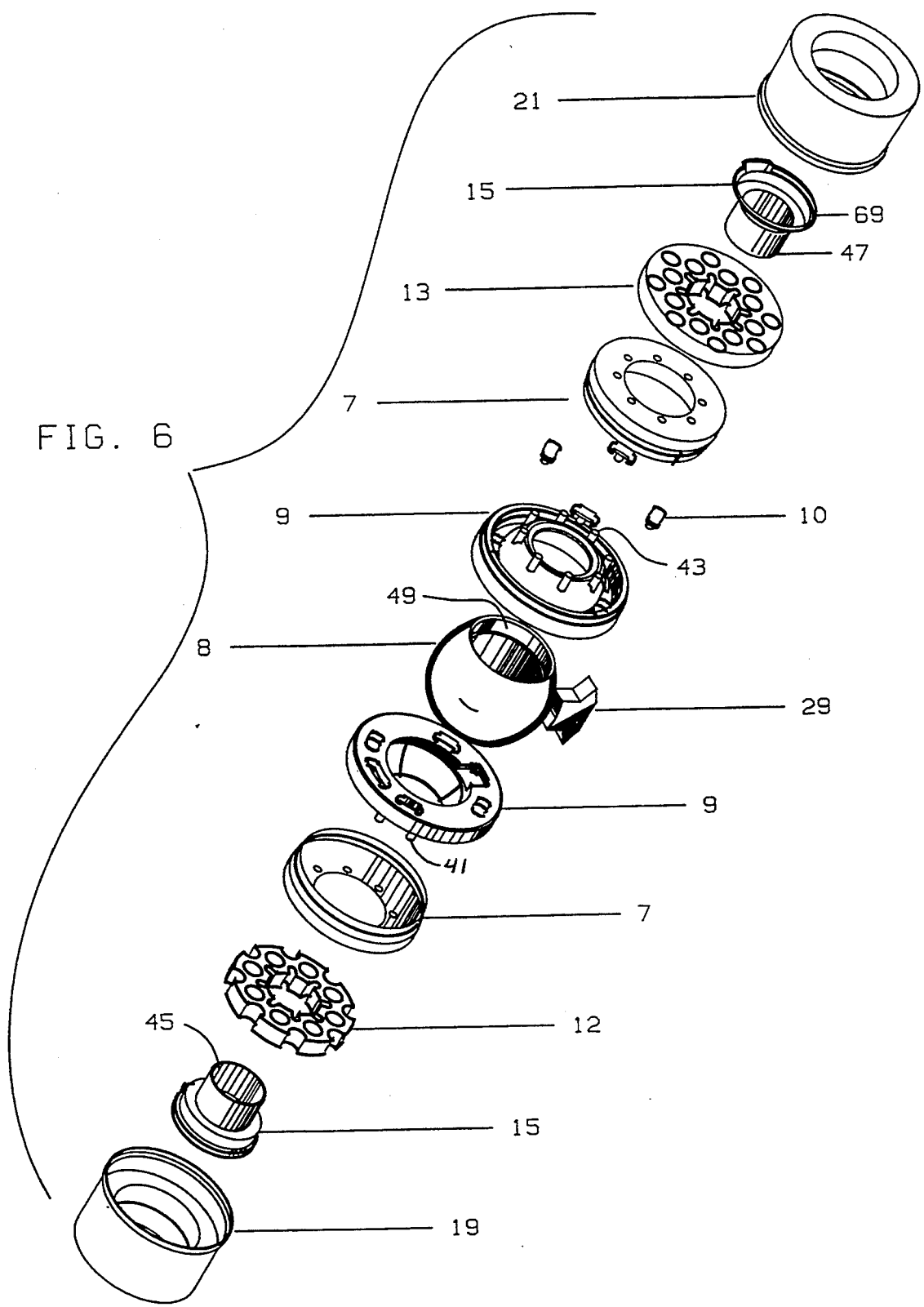
FIG. 6 is an exploded assembly view of a preferred embodiment of the package sliding element bearing of the present invention.
Figure 7A:
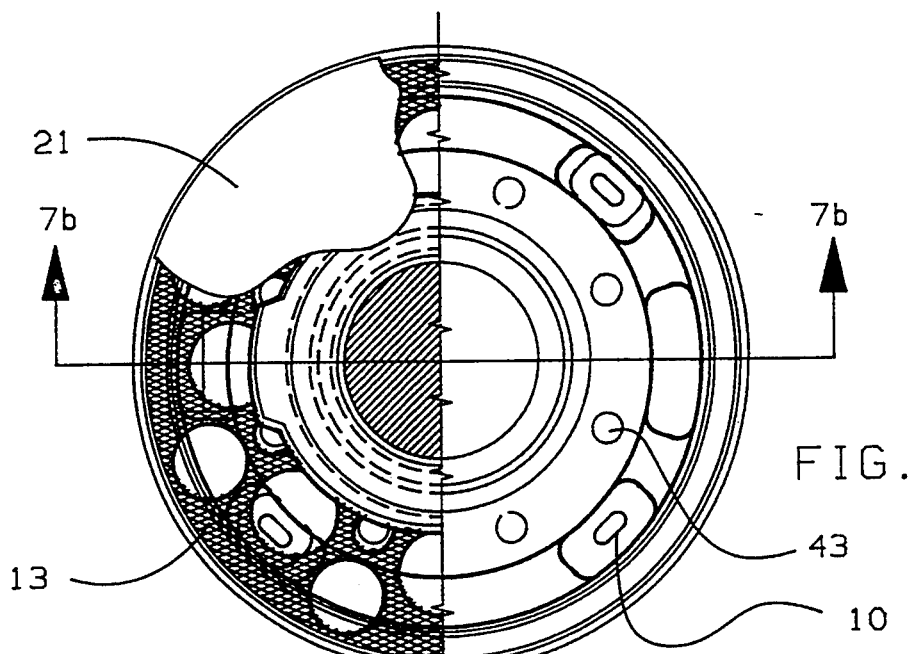
FIGS. 7a and 7b are radial and longitudinal section views respectively of the package sliding element bearing of FIG. 6.
Figure 7B:
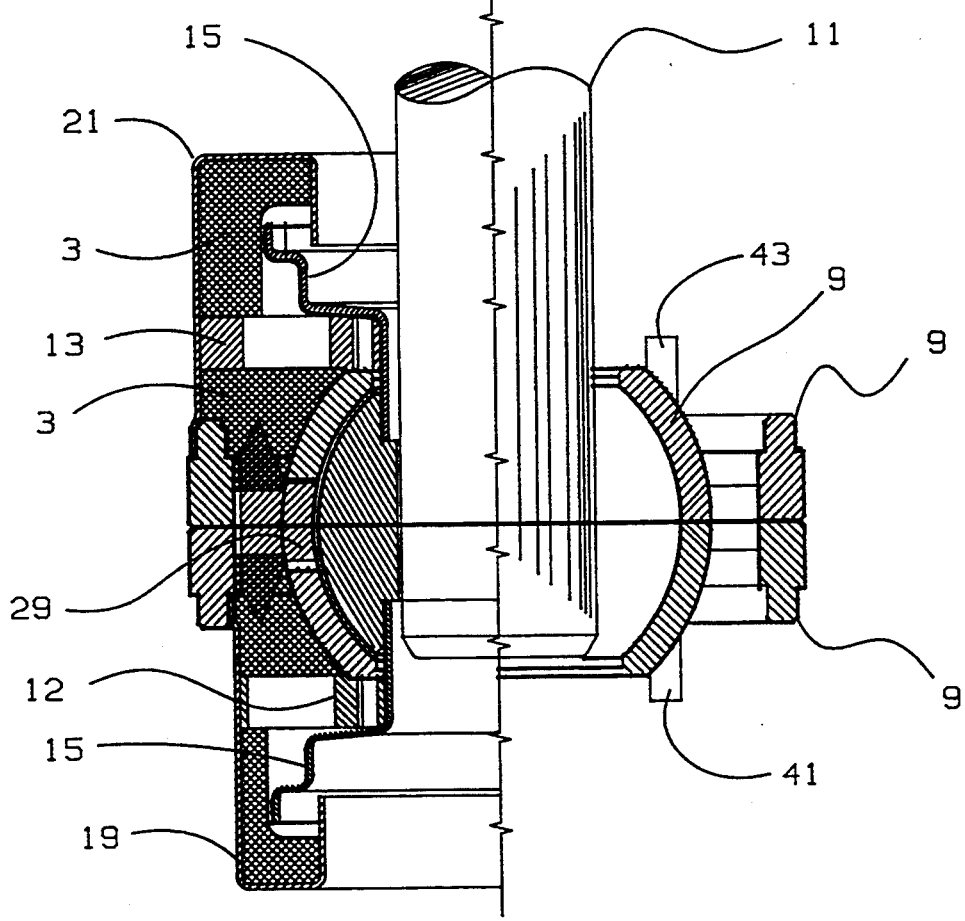

FIG. 6 is an exploded assembly view, and FIG. 7a and 7b show radial and longitudinal sections respectively of a preferred embodiment of the invention. The truncated spherical journal part 8 has a cylindrical inner bore for purposes of mounting it on a machine shaft 11 with adhesive. The bore is enlarged at each end as at 49 to permit press and adhesive joining to the outer diameters 47 of the cylindrical barrels of the lubricant throwers 15. The spherical outer surface is ground to be concentric to the bore within 0.0004" TIR, and to have a roughness of 4 to 6 microinches. The journal is made of an iron based powdered metal alloy that is hardened to about 62 Rockwell C for maximum resistance to wear against a somewhat softer powdered metal bearing. The truncated spherical surface journal 8 is confined between two truncated spherical surface half bearing parts 9. Two of these, normally identical, half bearing parts are held together to form a unified and rigid bearing surface assembly, by several axial rivets 10, that unify the two half bearing parts into a complete bearing surface part. The journal 8 is confined between these half bearing parts in both axial and radial directions within a nominal diametral clearance of 0.001" per inch of journal diameter. The outer diameter of the rims are held concentric in a common collet which exerts substantial inward pressure on the rims while the riveting process occurs, to avoid enlargement of the rims at the rivet locations. The low carbon steel rivets may be round or may be punched from flat sheets. The mating surfaces of the half bearing parts are sealed with adhesive to prevent loss of lubricant through this joint. Circumferential grooves in the mating surfaces optionally promote 360 degree extent of the adhesive. There is one central lubricant feeding wick 29, two end feeding wicks 12 and 13 in capillary contact with the outer end of the journal to bearing clearance space. There are projections such as 41 and 43 on the ends of the bearing parts 9 that hold the end feed wicks 12 and 13 in position. The end feed wicks 12 and 13 are made from wool or synthetic felts or from urethane foam and perform the function of transferring lubricant from the storage wicking and lubricant to the outer diameter of the cylindrical bores of the throwers 15 and to the ends of the clearance space with which the bore of the end feed wicks is in close capillary proximity. The bores of the end feed wicks is a light interference fit with the outer diameter of the throwers to assure flow of lubricant to the throwers. Holes in the wicks are sized and located to reduce the radial stiffness of the interference fit with the throwers so that the rubbing induced torque with the throwers is a minimum at the maximum interference fit condition due to tolerances. The end feed wicks 12 and 13 are assembled over the cylindrical locating projections that are on the ends of the bearing parts 9, and which keep these wicks from being rotated by the rubbing torque produced by the interference fit they have with the cylindrical portions 45 or 47 of the lubricant throwers 15. They also locate the wicks radially relative to the throwers. Two lubricant throwers 15 have eccentric outer lips which promote the highest efficiency of throwing of lubricant into a body of stored wicking and some lubricant that is contained by cup shaped covers 19 and 21 that are sealed to the outer rims of the half bearing parts. The cylindrical inner barrels 45 and 47 of the throwers are adhesively bonded and sealed to the inner diameters of the recesses 49 that are located at the ends of the bore of the journal. The bore of the journal is adhesively bonded to the machine shaft 1. The outer diameter of the rims of the half bearing parts are a slip fit in the machine housing and one provides a shoulder for locating the system axially in a machine housing. The radial walls of the lubricant throwers provide a surface for axially locating the bearing system against a locating surface on the machine shaft.

The system consists of a journal 8, that mounts on a shaft 11 at the cylindrical or conical bore of the journal. The journal has an outer rubbing surface shaped as a truncated sphere that is concentric to the bore, and is generally symmetrical about a radial centerline through the center of spherical curvature. The spherical journal surface has an angular span of about 90 degrees. This journal is confined between and within two identical truncated spherical bearing surfaces 9, each of which has an angular extent of about 45 degrees, and which are joined at a common radial plane, that passes through the center of curvature of the truncated spherical bearing surface, by means of axial oriented round or rectangular cross-section rivets 10, that pass through the radial walls of the half bearing parts.

Cup shaped covers 19 & 21, are adhesively bonded to rabbets on the outer and inner diameters of the cylindrical rims of the half bearing parts, and enclose a mixture of capillary fibrous wicking and fluid lubricant 3, that fill the enclosed space except for an inner space in which the outer lips of lubricant throwers rotate. This stored supply of wicking and lubricant feeds by capillary forces, lubricant to end feed wicks 12 & 13, that wipe lubricant on the outer diameter of the cylindrical bores of formed steel lubricant throwers in close capillary communication with the outer-ends of the capillary clearance space between the journal 8 and bearing 9 surfaces. These end feed wicks assure a positive supply of lubrication to prevent initial excess heating of the lubricant, for axial loading, at the closest clearance region, and a local reduction in lubricant surface tension, which is known to prevent the ingress of lubricant to a loaded bearing surface area if lubricant is not initially present.

A central feed wick 29, is also located on the radial centerline of the journal to feed lubricant to the periphery of the journal and is captured between the two half bearing parts. It provides positive lubricant feeding for radial loading.

This system is capable of carrying any combination of axial or radial loads that are applied to the machine shaft. Lubricant is fed to the outer ends of the clearance space since that is where lubrication must be positively applied because the journal first contacts the outer ends of the bearing surface when pure axial loading is applied, and an initial wear of the bearing surface occurs until the bearing surface conforms to the curvature of the journal. The heat generated due to friction at the first points of contact between the journal and bearing require that lubricant be present at these points before rotation starts producing heat, so that it can flow into the contact points, since lubricant will not flow into regions in which the lubricant viscosity and surface tension has become reduced initially by unlubricated friction and the heat it produces. Capillary forces provide this initial supply of lubricant by the nearness of the-contact area in the clearance and the proximity of the feed wick with the barrel of the lubricant thrower.

The spherical shape of the journal permits centrifugal forces to move lubricant radially outward toward the central radial axis of the bearing and away from the lubricant feeding circle at the outer ends of the clearance space. This pattern of lubricant flow axially away from the lubricant throwers (sometimes called slingers) tends to minimize loss of lubricant out of the system and promotes a very long operating life, and is a unique feature of the spherical surface bearing system. Lubricant then flows out of the clearance space into the central feed wick 29, located at the periphery of the journal. This wick also absorbs wear particles by filtering the lubricant.

Figure 8:
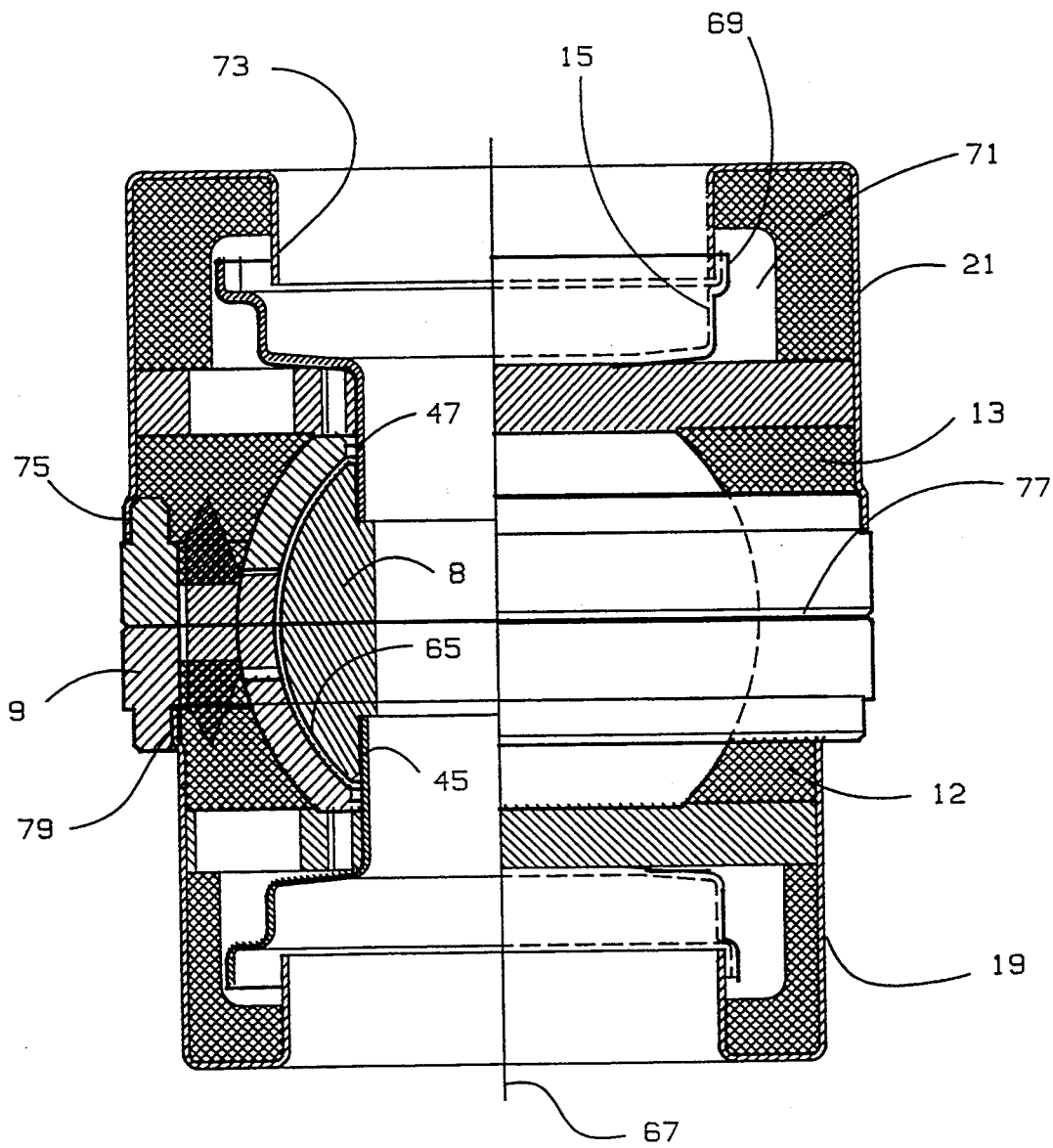
FIG. 8 shows a completely assembled bearing system.

In FIG. 8, the covers 19 and 21 as well as the wicking parts 12 and 13 are shown assembled to the bearing half parts 9 to complete assembly of the bearing system. The covers are made a fit to fit to tolerance loose fit with the bearing parts 9. The joints are sealed with adhesive to prevent loss of lubricant through the joints.

Figure 9:
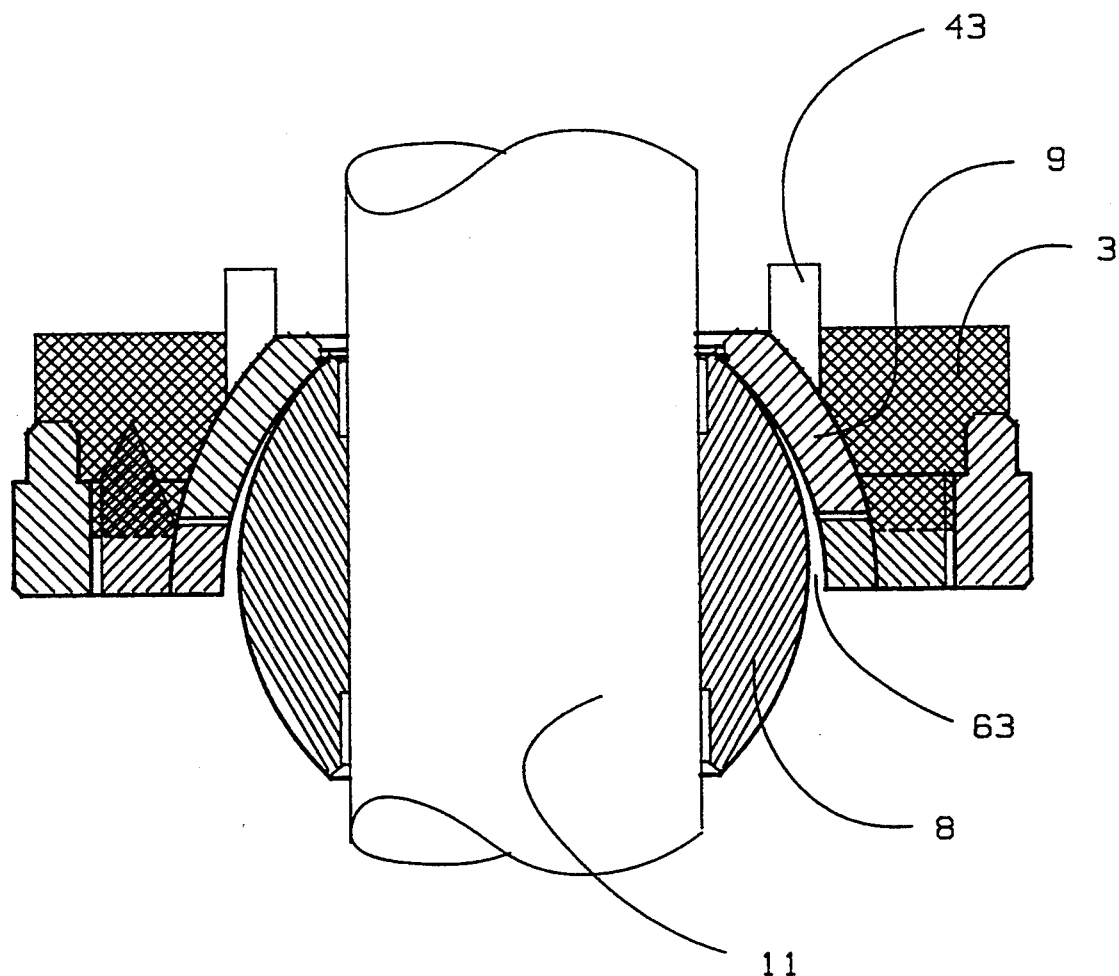
FIG. 9 illustrates axial bearing wear to maximize axial load capacity.

The spherical inner surface of the bearing parts 9 and the spherical outer surface of the journal part 8 may initially be of the same radius. In order for a small clearance to exist between these two surfaces, the radii can not be exactly the same and some wear or "breaking in" will, in this case, be required. In a preferred form, however, the bearing 9 has an internal bearing surface which is substantially the shape of the internal surface of a portion of a sphere with a radius that is 1.0004 to 1.002 times the radius of the spherical journal surface. FIG. 9 shows that in the spherical surface bearing system, the clearance between the journal and bearing surfaces, where load causes the journal surface to be closest to the bearing surface, is not perfectly uniform initially. But calculations show that a very small amount, (about 70% of the nominal initial radial clearance), of wearing away of the bearing surface is sufficient to make this clearance uniform for any direction of loading, whether pure radial, pure axial, or a mix of these. This preferential wear of the bearing surface is obtained by having the hardness of the journal surface greater than that of the initially hard bearing surface. The bearing surface is made of a softer material than is the journal part so that it will quickly wear enough to permit the operating radial clearance to become uniform over a large enough area of the bearing surface to maximize the hydrodynamic load capacity for loads in any direction, until the full area of the bearing surface is utilized. The maximum amount of wear that is needed to maximize hydrodynamic load capacity is small in relation to the difference in the spherical diameters of the bearing and journal surfaces. The needed wear is actually less than the nominal clearance, and is about 0.0002" for a 1" diameter journal.

In summary, a package sliding element bearing system that is capable of being assembled as a separate machine component to the bearing housings and shafts of machines has been disclosed. The system includes a journal portion 8 having an external surface which is substantially the shape of the external portion of a sphere. The journal part 8 has a cylindrical bore that is concentric with the spherical outer surface which permits this package bearing system to be assembled to a cylindrical portion of the shaft 11 of a machine so that the journal portion is positively caused to rotate and produce hydrodynamic action in the lubricant that is in the clearance space between the journal portion and a bearing portion 9 which surrounds and rotatably supports the journal portion. The bearing portion has an internal bearing surface which is also substantially the shape of the internal surface of a portion of a sphere with a radius that is 1.0004 to 1.002 times the radius of the spherical journal surface, to thereby provide the clearance space between the journal portion and the bearing portion within which hydrodynamically generated pressures can be developed within a fluid lubricant that is in this clearance space. The bearing portion is formed as a pair of frusto-hemispherical pieces joined at a common plane. There is a reservoir 3 of fluid lubricant held within the capillary spaces between a structure of fibers, and enclosed within thin metal covers 19 and 21. This fluid lubricant is supplied to a clearance space such as 65 of FIG. 8 or 63 of FIG. 9 by a plurality of feed wicks 12, 13 and 29 which have structural integrity in tension and are composed of fibers with capillary spaces between them, and that are in capillary communication with the fiber structure of the reservoir 3 of fluid lubricant. A pair of these feed wicks, 12 and 13, are located in close proximity with the outer ends of the clearance space (63 or 65) at the axial extremes of the spherical surface of the journal portion 8 to supply lubricant to that clearance space. These feed wicks are mounted on pins such as 41 or 43 which pins extending axially in the direction of the axis 67 of the bearing assembly. These pins extend from the outer ends of the bearing portions and serve to keep these end feed wicks 12 and 13 centralized with the axis 67 of the journal and also keep them from rotating due to friction with axial extensions of the journal surface onto which they wipe lubricant. There is another feed wick 29 that is captured in a recess between the two portions 9 of the bearing surface and centered on the common plane at which these bearing portions are joined. The wick 29 contacts the said journal portion 8 about midway between the axial extremes thereof so that lubricant is wiped onto the spherical surface of said journal generally along an equatorial great circle.

The lubricant that flows axially away from the outer ends of the clearance space is receiving and recirculated back to the lubricant reservoir by a pair of lubricant throwers 15 each with a cylindrical inner portion 45 or 47 that are cemented into cylindrical recesses in the outer ends 49 of the journal portion. The cylindrical inner portions of the throwers or slingers thus are located adjacent to the axial extremes of the clearance space and of the extremes of the journal portion. The throwers have cylindrical outer lips with about an 0.035 inch axial length, about 10% of which is slightly eccentric to the axis of the journal part to promote efficiency of lubricant throwing. The outer lips 69 of said throwers extend into a clearance space 71 in the covers 19 or 21 that hold the reservoir or lubricant. The inner lips such as 73 of the covers extend axially inward so that lubricant that is thrown or that drips from the lips 69 of the throwers, while they are stationary, falls into the reservoir 3 of lubricant for any position of the axis of the journal portion due to the action of gravity.

The lubricant reservoir covers are fastened and sealed to their respective bearing portions with adhesive at the respective outer 75 and inner 79 cylindrical joints. The bearing portions 9 are sealed to each other at the mating interface surface 77, The lubricant throwers are fastened and sealed to the journal part with adhesive to prevent loss of lubricant out of the bearing system through these joints. The joints are fit-to-fit to tolerance-loose to facilitate adhesive assembly.

The spherical journal surface is sufficiently harder than the spherical bearing surface so that the bearing surface wears more rapidly under axial or radial loading to promote rapid conformity of the curvature of the bearing surface to that of the journal which maximizes the hydrodynamic load capacity for any direction of loading as discussed earlier in conjunction with FIG. 9.

FIG. 10 shows an alternate embodiment for lowest cost with a correspondingly reduced operating life. This embodiment permits the bearing system to be made at a lower cost for applications that do not need the very long operating life that is provided by the preferred embodiment of FIGS. 8 & 7, that uses lubricant throwers and a lubricant recirculation system. In the low cost embodiment, the cost of throwers and bearing parts that are separate from the wicking and lubricant enclosures are eliminated to reduce cost. This simplified bearing system has a pair of bearing halves 51 and 53 which capture lubricant saturated wicking 55 and 57 and journal portion 59. Lubricant is supplied from the wicking to the journal part by wiper 61. Openings in the bore of the bearing part permit some recirculation of end leakage lubricant that leaves the outer ends of the clearance, are a design option, as is the precision to which the spherical surfaces are formed. There are a variety of costs and corresponding performances permitted by theses design and manufacturing options.

From the foregoing, it is now apparent that a novel bearing arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A sliding element bearing system comprising:
   a journal portion with an external surface which is substantially the shape of the external surface of a portion of a sphere and with a central bore that is concentric to the spherical outer surface and that can be assembled onto and fixed to rotate with a rotatable shaft;
   a bearing portion surrounding and rotatably supporting the journal portion, the bearing portion having an internal bearing surface which is substantially the shape of the internal surface of a portion of a sphere of radius slightly greater than the radius of the spherical surface of the journal portion to thereby provide a clearance space between the journal portion and the bearing portion, the bearing portion comprising a pair of frusto-hemispherical pieces joined at a common plane;
   the rotatable shaft being elongated and having a central axis about which it may rotate, the bearing system further comprising a source of fluid lubricant, and means for supplying lubricant from the source to the clearance space between the journal portion and the bearing portion at the plurality of locations spaced from one another in the direction of shaft elongation, the means for supplying lubricant comprising a fluid lubricant reservoir and a plurality of feed wicks made of fibers with capillary spaces therebetween, a pair of said feed wicks located one each in close proximity to the clearance space near the axial extremes of the journal portion to supply lubricant to said clearance space, and another feed wick contacting the journal portion about midway between the axial extremes thereof.

2. The bearing system of claim 1 wherein the journal portion is fixed to the shaft for rotation therewith.

3. The bearing system of claim 1 wherein the radius of the spherical bearing surface is between 1.004 and 1.002 times the radius of the spherical journal surface.

4. The bearing system of claim 1 wherein the spherical journal surface is harder than the spherical bearing surface so that the bearing surface wears more rapidly under loading to promote rapid conformity of the curvature of the bearing surface to that of the journal surface.

5. A sliding element bearing system comprising:
   an elongated rotatable shaft having an axis of rotation extending in its direction of elongation
   a journal portion with an external surface which is substantially the shape of the external surface of a portion of a sphere and with a central bore that is concentric to the spherical outer surface and that can be assembled onto and fixed to rotate with the rotatable shaft;
   a bearing portion surrounding and rotatably supporting the journal portion, the bearing portion having an internal bearing surface which is substantially the shape of the internal surface of a portion of a sphere of radius slightly greater than the radius of the spherical surface of the journal portion to thereby provide a clearance space between the journal portion and the bearing portion;
   a source of fluid lubricant; and
   means for supplying lubricant from the source to the clearance space between the journal portion and the bearing portion at a plurality of locations spaced from one another in the direction of shaft elongation, the means for supplying lubricant comprising a capillary fluid lubricant reservoir, and a plurality of feed wicks made of fibers with capillary spaces therebetween, a pair of said feed wicks located one each in close proximity to the clearance space near the axial extremes of the journal portion to supply lubricant to said clearance space, a plurality of pins for engaging said pair of feed wicks to maintain the maintain the location thereof relative to the shaft and to prevent rotation of said pair of feed wicks with the shaft, and another feed wick held captive in the bearing portion and contacting the journal portion about midway between the axial extremes thereof.

6. A self-aligning sliding element bearing system comprising:

an elongated shaft having a central axis about which the shaft may rotate;

a journal portion encircling the shaft, the journal portion having an external surface which is substantially the shape of the external surface of a portion of a sphere, the journal portion fixed to the shaft for rotation therewith about the shaft axis;

a bearing portion surrounding and rotatably supporting the journal portion, the bearing portion having an internal bearing surface which is substantially the shape of the internal surface of a portion of a sphere of radius slightly greater than the radius of the spherical surface of the journal portion to thereby provide a clearance space between the journal portion and the bearing portion, the clearance space allowing a limited angular change of the direction of elongation of the shaft relative to the bearing portion;

a fluid lubricant reservoir;

means for supplying lubricant from the reservoir to the clearance space between the journal portion and the bearing portion at a plurality of locations spaced from one another in the direction of shaft elongation, the means for supplying lubricant comprising a plurality if feed wicks made of fibers with capillary spaces therebetween, a pair of said feed wicks located one each in close proximity to the clearance space near the axial extremes of the journal portion to supply lubricant to said clearance space, means for maintaining the location of said pair of feed wicks relative to the shaft and for preventing rotation thereof relative to the shaft, and another feed wick contacting the journal portion about midway between the axial extremes thereof; and means receiving lubricant from the clearance space and returning the received lubricant to the reservoir.

7. A package sliding element bearing system comprising:

a journal portion with an external surface which is substantially the shape of the external surface of a portion of a sphere and with a central bore that is concentric to the spherical outer surface and that can be assembled onto and fixed to rotate with a rotatable shaft;

a bearing portion surrounding and rotatably supporting the journal portion for relative rotation therebetween about an axis, the bearing portion having an internal bearing surface which is substantially the shape of the internal surface of a portion of a sphere of radius slightly greater than the radius of the spherical surface of the journal portion to thereby provide a clearance space between the journal portion and the bearing portion;

a fluid lubricant reservoir;

means for supplying lubricant from the reservoir to the clearance space between the journal portion and the bearing portion at a plurality of axially spaced locations, the means for supplying lubricant comprising a plurality of feed wicks made if fibers with capillary spaces therebetween, a pair of said feed wicks located one each in close proximity to the clearance space near the axial extremes of the journal portion to supply lubricant to said clearance space, means for maintaining the location of said pair of feed wicks relative to the axis, and another feed wick contacting the journal portion about midway between the axial extremes therof; and means receiving lubricant from the clearance space and returning the received lubricant to the reservoir.

8. The package sliding element bearing system of claim 7 wherein the radius of the spherical bearing surface is between 1.0004 and 1.002 times the radius of the spherical journal surface and the spherical journal surface is harder than the spherical bearing surface so that the bearing surface wears more rapidly under loading to promote rapid conformity of the curvature of the bearing surface to that of the journal surface.

9. The package sliding element bearing system of claim 7 wherein the means for receiving lubricant from the clearance space comprises a pair of lubricant slingers located adjacent the axial extremes of the journal portion, the fluid lubricant reservoir extending axially beyond the axial extremes of the journal portion to receive lubricant from the lubricant slingers thrown therefrom by centrifugal force, the lubricant reservoir having radial inwardly extending portions near its axial extremes for receiving lubricant which may drip from the slingers due to the action of gravity.

10. The package sliding element bearing system of claim 9 wherein each of the lubricant slingers includes a peripheral portion which is eccentric to the central axis for enhancing the throwing of lubricant by centrifugal force.

11. A package sliding element bearing system for assembly into a machine bearing comprising:

a journal portion having an external surface which is substantially the shape of the external surface of a portion of a sphere and a central cylindrical bore concentric with the spherical outer surface;

a bearing portion substantially surrounding and supporting the journal portion for relative rotation therebetween, the bearing portion comprising a pair of segments of a sphere joined together to capture the journal portion therebetween, the bearing portion being formed of a pair of frusto-hemispherical pieces joined at a common plane and having an internal bearing surface which is substantially the shape of the internal surface of a portion of a sphere of radius slightly greater than the radius of the spherical surface of the journal portion to thereby provide a clearance space between the journal portion and the bearing portion;

the cylindrical bore having a central axis about which journal portion and bearing portion are relatively rotatable, the bearing system further comprising a source of fluid lubricant, and means for supplying lubricant from the source to the clearance space between the journal portion and the bearing portion at a plurality of locations spaced from one another in the direction of the central axis, the means for supplying lubricant comprising a fluid lubricant reservoir, and a plurality of feed wicks made of fibers with capillary spaces therebetween, a pair of said feed wicks located one each in close proximity to the clearance space near the axial extremes of the journal portion to supply lubricant to said clearance space, and another feed wick contacting the journal portion about midway between the axial extremes thereof.

12. The package sliding element bearing system claim 11 wherein the radius of the spherical bearing surface is between 1.004 and 1.002 times the radius of the spherical journal surface.

13. The package sliding element bearing system of claim 11 wherein the spherical journal surface is harder than the spherical bearing surface so that the bearing surface wears more rapidly under loading to promote rapid conformity of the curvature of a bearing surface to that of the journal surface.

14. A package sliding element bearing system for assembly into a machine bearing housing comprising:
   a journal portion having an external surface which is substantially the shape of the external surface of a portion of a sphere and a central cylindrical bore concentric with the spherical outer surface;
   a bearing portion substantially surrounding and supporting the journal portion for relative rotation therebetween, the bearing portion comprising a pair of segments of a sphere joined together to capture the journal portion therebetween, the radius of the spherical bearing surface between 1.0004 and 1.002 times the radius of the spherical journal surface and the spherical journal surface being harder than the spherical bearing surface so that the bearing surface wears more rapidly under either axial or radial loading to promote rapid conformity of the curvature of the bearing surface to that of the journal surface;
   the bearing portion being formed of a pair of frusto-hemispherical pieces joined at a common plane and has an internal bearing surface which is substantially the shape of the internal surface of a portion of a sphere of radius slightly greater than the radius of the spherical surface of the journal portion to thereby provide a clearance space between the journal portion and the bearing portion;
   the cylindrical bore having a central axis about which journal portion and bearing portion are relatively rotatable, the bearing system further comprising a source of fluid lubricant, and means for supplying lubricant from the source to the clearance space between the journal portion and the bearing portion at a plurality of locations spaced from one another in the direction of the central axis;
   the means for supplying lubricant comprising a fluid lubricant reservoir, and a plurality of feed wicks made of fibers with capillary spaces therebetween, a pair of said feed wicks located one each in close proximity to and in capillary communication with the clearance space near the axial extremes of the journal portion to supply lubricant to said clearance space, and another feed wick contracting the journal portion about midway between the axial extremes thereof, said another feed wick being captured in a recess between the pair of frusto-hemispherical pieces; and
   means receiving lubricant from the clearance space and returning the received lubricant to the reservoir comprising a pair of lubricant slingers located adjacent the axial extremes of the journal portion, the fluid lubricant reservoir extending axially beyond the axial extremes of the journal portion to receive lubricant from the lubricant slingers thrown therefrom by centrifugal force, the lubricant reservoir having radial inwardly extending portions near its axial extremes for receiving lubricant which may drip from the slingers due to the action of gravity, each of the lubricant slingers including a peripheral portion which is eccentric to the central axis for enhancing the throwing of lubricant by centrifugal force.

* * * * *